United States Patent
Cao

(10) Patent No.: US 10,222,899 B2
(45) Date of Patent: Mar. 5, 2019

(54) TOUCH SUBSTRATE, TOUCH DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD, Anhui (CN)

(72) Inventor: Binbin Cao, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 259 days.

(21) Appl. No.: 15/259,695

(22) Filed: Sep. 8, 2016

(65) Prior Publication Data
US 2017/0123564 A1 May 4, 2017

(30) Foreign Application Priority Data
Oct. 28, 2015 (CN) .......................... 2015 1 0711716

(51) Int. Cl.
*G09G 5/00* (2006.01)
*G06F 3/041* (2006.01)
(Continued)

(52) U.S. Cl.
CPC ........ *G06F 3/0416* (2013.01); *G02F 1/13318* (2013.01); *G02F 1/13338* (2013.01);
(Continued)

(58) Field of Classification Search
CPC .... G06F 3/0416; G06F 3/0412; G06F 3/0414; G02F 1/13318; G02F 1/13338; G02F 2001/133394
(Continued)

(56) References Cited

U.S. PATENT DOCUMENTS

2006/0097975 A1 5/2006 Lee et al.
2011/0080367 A1 4/2011 Marchand et al.
(Continued)

FOREIGN PATENT DOCUMENTS

CN 1773335 A 5/2006
CN 102402347 A 4/2012
(Continued)

OTHER PUBLICATIONS

First Office Action for Chinese Application No. 201510711716.7, dated Sep. 19, 2017, 8 Pages.

*Primary Examiner* — Jennifer T Nguyen
(74) *Attorney, Agent, or Firm* — Brooks Kushman P.C.

(57) ABSTRACT

The present disclosure provides a touch substrate, a touch display panel and a display device which belong to a field of touch display. The touch substrate includes a plurality of photo-sensing thin film transistor arranged on the substrate, the touch substrate further includes a piezoelectric sensing structure arranged above at least one of the photo-sensing thin film transistors, and a breakover current between a source and a drain of the photo-sensing thin film transistor corresponding to the piezoelectric sensing structure is changed, when the at least one piezoelectric sensing structure is pressed.

18 Claims, 2 Drawing Sheets

(51) Int. Cl.
  *G02F 1/133*   (2006.01)
  *G02F 1/1333*  (2006.01)
  *G06F 3/042*   (2006.01)
  *G06F 3/044*   (2006.01)

(52) U.S. Cl.
  CPC ............ *G06F 3/042* (2013.01); *G06F 3/0412* (2013.01); *G06F 3/0414* (2013.01); *G02F 2001/133394* (2013.01); *G06F 3/044* (2013.01); *G06F 2203/04106* (2013.01)

(58) Field of Classification Search
  USPC ................................................ 345/173, 175
  See application file for complete search history.

(56) References Cited

U.S. PATENT DOCUMENTS

2014/0063365 A1    3/2014  Li et al.
2014/0354608 A1*  12/2014  Kitchens, II .......... G06F 1/3215
                                                          345/204
2014/0362000 A1*  12/2014  Seo .................... G02F 1/13394
                                                          345/173

FOREIGN PATENT DOCUMENTS

CN        102707470 A    10/2012
CN        203870596 U    10/2014
WO       2014197247 A1   12/2014

\* cited by examiner

TOUCH SUBSTRATE, TOUCH DISPLAY PANEL AND DISPLAY DEVICE

CROSS-REFERENCE TO RELATED APPLICATIONS

This application claims priority to Chinese application No. 201510711716.7, filed Oct. 28, 2015, which is hereby incorporated by reference in its entirety.

TECHNICAL FIELD

The present disclosure relates to a field of touch display, and in particular, to a touch substrate, a touch display panel and a display device.

BACKGROUND

A touch screen is an input device that allows a user to input commands of the user by selecting instruction contents on a screen of a graphic display or the like directly using a hand or an object. When the user touches a touch screen directly using the hand or the object, the touch screen detects touch points and drives the display according to instructions corresponding to selected icons, so as to implement specific displaying.

Touch screens currently commercially available include add-on type touch screens and integration type touch screens. The integration type touch screen is made by integrating a liquid crystal display panel with a touch panel when producing the liquid crystal display panel. The integration of the integration type touch screen has two fashions, one of which integrates a function of the touch panel on a color filter substrate of the liquid crystal display panel (which is also known as "on-cell integration"), and the other of which integrates the function of the touch panel between the color filter substrate of the liquid crystal display panel and an array substrate (which is also known as "in-cell integration").

The "in-cell" integration can reduce a thickness of a liquid crystal display device significantly. At present, design patterns for the liquid crystal display device in the "in-cell" integration have multiple styles, one of which is a photo-sensing touch design. Nevertheless, such a touch design has a relatively low accuracy and can only sense light variation, and thus has a narrow applicable scope.

In another type of photo-sensing touch design, an integrated Touch Sensor (a touch sensing element) is added onto each pixel or several pixels. The integrated Touch Sensor is made up of two parts, i.e., Photo Sensor and LC Cap Sensor (Liquid crystal cell gap sensing element). This touch fashion makes touch more precise and sensitive. However, this touch fashion needs arranging a relatively large number of sensing elements, and has a significant influence on aperture ratio of the display device. Additionally, the LC Cap Sensor will increase a power consumption of the display device and tends to influence liquid crystal tilting, especially for the display device in an ADS mode.

SUMMARY

The technical problem to be solved by the present disclosure is to provide a touch substrate, a touch display panel and a display device, which can increase touch sensibility and an applicable range without influencing an aperture ratio and a power consumption of a display device.

To solve the above technical problem, the embodiments of the present disclosure provide technical solutions as follow.

In one aspect, a touch substrate is provided which comprises an array substrate and a plurality of photo-sensing thin film transistor arranged on the array substrate, wherein the touch substrate further comprises: a piezoelectric sensing structure arranged above at least one of the plurality of photo-sensing thin film transistors, wherein a breakover current between a source and a drain of the photo-sensing thin film transistor corresponding to the piezoelectric sensing structures is changed when the at least one piezoelectric sensing structure is pressed.

Further, each of the photo-sensing thin film transistors is arranged in a partial region of a sub-pixel.

Still further, the plurality of photo-sensing thin film transistors is arranged uniformly on the array substrate.

Still further, an insulation layer is arranged between each of the at least one of the photo-sensing thin film transistor and the corresponding piezoelectric sensing structure.

Still further, a first end of the piezoelectric sensing structure is connected to the source of the photo-sensing thin film transitory, and a second end opposite to first end of the piezoelectric sensing structure is connected to a drain of the photo-sensing thin film transistor.

Still further, the piezoelectric sensing structure is made of a transparent piezoelectric material having a light transmissivity larger than a first predetermined value.

Still further, the transparent piezoelectric material is polyvinylidene difluoride or polylactide.

Still further, the array substrate comprises a base substrate, and a film layer and a switch thin film transistor arranged on the base substrate, wherein a projection of the piezoelectric sensing structure on the base substrate coincides with a projection of the corresponding photo-sensing thin film transistor on the base substrate, or is located within a region of the projection of the corresponding photo-sensing thin film transistor on the base substrate.

Still further, the switch thin film transistor is arranged in the same layer of the photo-sensing thin film transistors.

In some embodiments of the present disclosure, a touch display panel is further provided which includes the above touch substrate and a cell alignment substrate arranged oppositely to the touch substrate.

Further, a protuberance is arranged in a position on the cell alignment substrate corresponding to the piezoelectric sensing structure, and a gap is reserved between the protuberance and the piezoelectric sensing structure.

Still further, an interval between a surface of the protuberance facing the piezoelectric sensing structure and a surface of the piezoelectric sensing structure facing the protuberance is 10-100 nm.

Still further, the protuberance is made of a transparent material having a light transmissivity larger than a second predetermined value.

Still further, the protuberance is located on a surface of the substrate facing the touch substrate, and is in a one-to-one correspondence to the piezoelectric sensing structure.

Still further, the piezoelectric sensing structure is arranged between the photo-sensing thin film transistor and the protuberance.

In some embodiments of the present disclosure, a display device is provided which includes the above touch display panel.

The embodiments of the present disclosure have the following advantages.

According to the above technical solutions, because the piezoelectric sensing structures are arranged on the touch substrate provided with the photo-sensing thin film transistors, press sensing can be achieved by means of the piezoelectric sensing structures without any touch sensing thin film transistor. The piezoelectric sensing structures have a simple structure, so the aperture ratio and the power consumption of the display panel may not be increased, and the liquid crystal display may not be influenced adversely, and thus are applicable to various display modes. By combining the photo-sensing thin film transistor with the piezoelectric sensing structures, the display panel can sense both the light effects and/or the piezoelectric effects when touching the display panel with fingers, and thus the accuracy and the applicable range of the display panel with photo-sensing embedded can be increased. Compared with individual photo-sensing touch, the piezoelectric sensing can cause the display panel to be usable under more intense environmental lumination; and compared with individual piezoelectric sensing, the photo-sensing can decrease the strength of the press sensing and thus extend the lifetime of the display panel.

REFERENCE NUMERALS

101/102 base substrate, 103 film layer, 104 spacer, 105 color filter, 106 switch thin film transistor, 109 backlight source, 110 photo-sensing thin film transistor, 111 liquid crystal cell gap sensing element, 112 protuberance, 113 upper electrode, 114 lower electrode, 201/202 base substrate, 203 film layer, 204 spacer, 205 color filter, 206 switch thin film transistor, 207 piezoelectric sensing structure, 208 protuberance, 209 backlight source, 210 photo-sensing thin film transistor, 301 insulation layer, 302 source electrode, 303 drain electrode.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

To make technical problems to be solved, technical solutions, and advantages of embodiments of the present disclosure more clear, specific embodiments will be described hereinafter in detail in combination with the drawings.

Figure 1:
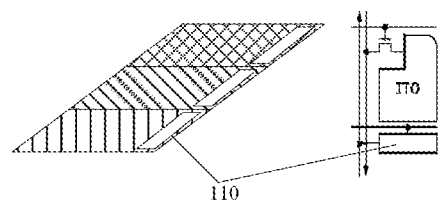
FIG. 1 is a schematic diagram of a photo-sensing touch design in the related art.
Figure 2:
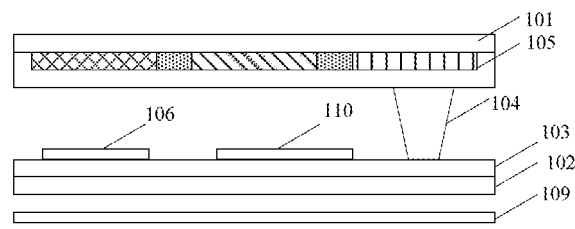
FIG. 2 is a schematic diagram of a photo-sensing touch substrate in the related art.

At present, design patterns for the liquid crystal display device in the "in-cell" integration have multiple styles, one of which is the photo-sensing touch design as shown in FIG. 1 and FIG. 2. A principle of such design is as follows. The liquid crystal display device includes a backlight source 109, a color filter substrate, an array substrate. The color filter substrate includes a base substrate 101 and a color filter 105 arranged on the base substrates 10, and further includes a spacer 104 arranged thereon. The array substrate includes a base substrate 102, and a film layer 103 and a switch thin film transistor 106 arranged on the base substrate 102. A photo-sensing thin film transistor (Photo Sensor) 110 is arranged on several pixels or each pixel. At the time of operating with a finger or a stylus, the Photo Sensor can sense infrared rays reflected from a touch point, convert the infrared rays into electrical signals, and feed the electrical signals back to an integrated circuit which calculates and determines coordinates and a shape of the touch point. The Photo Sensor can be arranged on the same layer as the switch thin film transistor 106 and convert light signals into the electrical signals. However, such touch fashion has a relatively low accuracy and can only sense light variation, and thus its applicable range is narrow.

Figure 3:
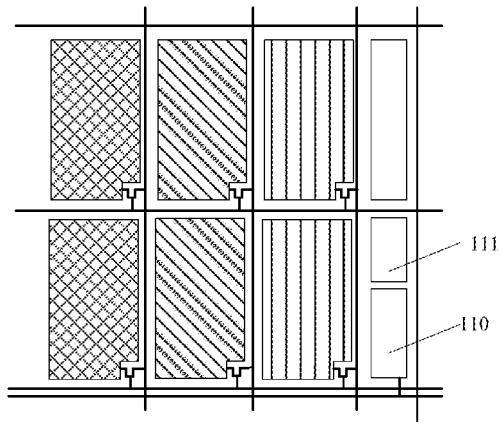
FIG. 3 is a diagram of another photo-sensing touch design in the related art.
Figure 4:
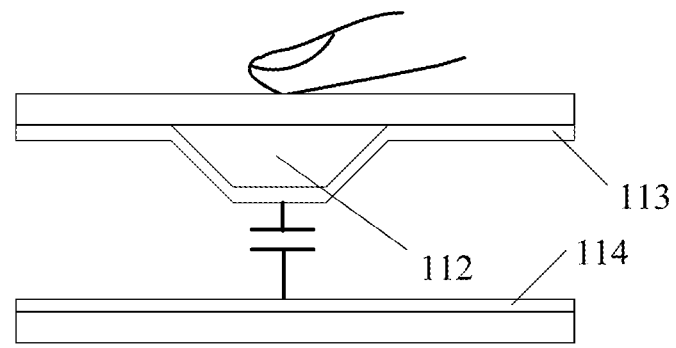
FIG. 4 is a schematic diagram of another photo-sensing touch substrate in the related art.

FIG. 3 is another photo-sensing touch design in the related art. An integrated Touch Sensor (touch sensing element) is added onto several pixels or each pixel, and is made up of two parts, i.e., Photo Sensor 110 and LC CAP Sensor (liquid crystal cell gap sensing element) 111. As shown in FIG. 4, the LC Cap Sensor can be made of an upper electrode 113 arranged on a bump 112, and a lower electrode 114. The integrated Touch Sensor can sense both light variations and capacitance variations. Thus, whether a touch point voltage changes or light changes, the integrated circuit can determine the coordinates of the touch point, and thus the touch is more accurate and sensitive. However, it is need to arrange a relatively larger number of sensing elements, thereby having a significant adverse influence on aperture ratio of the display device. Additionally, the LC Cap Sensor will increase a power consumption of the display device and tends to influence liquid crystal tilting, especially for the display device in an ADS mode.

The touch substrate, the touch display panel and the display device provided in some embodiments of the present disclosure can increase the sensibility and the applicable range of the touch without adversely influencing an aperture ratio and a power consumption of the display device.

In some embodiments of the present disclosure, a touch substrate is provided, which includes a plurality of photo-sensing thin film transistor arranged on the touch substrate, a sensing structure arranged above at least one of the plurality of photo-sensing thin film transistors; a breakover current between a source and a drain of the photo-sensing thin film transistor corresponding to the one of the at least one piezoelectric sensing structures is changed when the at least one piezoelectric sensing structure is pressed.

In some embodiments of the present disclosure, because the piezoelectric sensing structures are arranged on the touch substrate provided with the photo-sensing thin film transistors, press sensing can be achieved by means of the piezoelectric sensing structures without any touch sensing thin film transistor. The piezoelectric sensing structures have a simple structure, so the aperture ratio and the power consumption of the display panel may not be increased, and the liquid crystal display may not be influenced adversely, and thus are applicable to various display modes. By combining the photo-sensing thin film transistor with the piezoelectric sensing structures, the display panel can sense both the light effects and/or the piezoelectric effects when touching the display panel with fingers, and thus the accuracy and the applicable range of the display panel with photo-sensing embedded can be increased. Compared with individual photo-sensing touch, the piezoelectric sensing can cause the display panel to be usable under more intense environmental lumination; and compared with individual piezoelectric sensing, the photo-sensing can decrease the strength of the press sensing and thus extend the lifetime of the display panel.

In some embodiments of the present disclosure, each of the photo-sensing thin film transistors can be arranged in a partial region of a sub-pixel.

Optionally, the plurality of photo-sensing thin film transistors is uniformly arranged on the touch substrate so that external light can be sensed evenly.

In some embodiments of the present disclosure, an insulation layer is arranged between the photo-sensing thin film transistor and the piezoelectric sensing structure. The insulation layer is arranged on the photo-sensing thin film transistor, and the piezoelectric sensing structure is arranged on the insulation layer and corresponding to an area between a source and a drain of the photo-sensing thin film transistor. When the piezoelectric sensing structure is pressed, the piezoelectric sensing structure generates a current which causes the breakover current between the source and the drain of the photo-sensing thin film transistor to be changed, and thus a press position can be detected.

In some embodiments of the present disclosure, a first end of the piezoelectric sensing structure is connected to the source of the photo-sensing thin film transistor, and a second end opposite to the first end of the piezoelectric sensing structure is connected to the drain of the photo-sensing thin film transistor. When the piezoelectric sensing structure is pressed, the piezoelectric sensing structure generates a current which further causes short-circuiting between the drain and the source of the photo-sensing thin film transistor. Thus, the press position can be detected.

In some embodiments of the present disclosure, the piezoelectric sensing structure is made of a transparent piezoelectric material having a light transmissivity larger than a first predetermined value. In this way, even if the piezoelectric sensing structure is arranged above the photo-sensing thin transistor, light sensing by the photo-sensing thin film transistor would not be affected.

In some embodiments of the present disclosure, the transparent piezoelectric material is polyvinylidene difluoride (PVDF) or polylactide (PLA).

In some embodiments of the present disclosure, a touch display panel is further provided which includes the above touch substrate and a substrate arranged oppositely to the touch substrate to form a cell with the touch substrate.

In some embodiments of the present disclosure, because the piezoelectric sensing structures are arranged on the touch substrate provided with the photo-sensing thin film transistors, press sensing can be achieved by means of the piezoelectric sensing structures without any touch sensing thin film transistor. The piezoelectric sensing structures have a simple structure, so the aperture ratio and the power consumption of the display panel may not be increased, and the liquid crystal display may not be influenced adversely, and thus are applicable to various display modes. By combining the photo-sensing thin film transistor with the piezoelectric sensing structures, the display panel can sense both the light effects and/or the piezoelectric effects when touching the display panel with fingers, and thus the accuracy and the applicable range of the display panel with photo-sensing embedded can be increased. Compared with individual photo-sensing touch, the piezoelectric sensing can cause the display panel to be usable under more intense environmental lumination; and compared with individual piezoelectric sensing, the photo-sensing can decrease the strength of the press sensing and thus extend the lifetime of the display panel.

In some embodiments of the present disclosure, a protuberance is arranged at a position on the cell alignment substrate corresponding to the position of the piezoelectric sensing structure. A gap is reserved between the protuberance and the piezoelectric sensing structure. In this way, an interval between the cell alignment substrate and the piezoelectric sensing structure can be reduced so that a piezoelectric effect can be generated by smaller deformation to facilitate touch sensing.

In some embodiments of the present disclosure, the interval between the protuberance and the piezoelectric sensing structure is 10-100 nm. In such case, not only the piezoelectric effect can be generated by smaller deformation to facilitate touch sensing, but also false sensing due to too small interval between the protuberance and the piezoelectric sensing structure can be avoided.

In some embodiments of the present disclosure, the protuberance is made of a transparent material having a light transmissivity larger than a second predetermined value. In this way, a transmissivity of the display panel may not be adversely influenced, nor light sensing by the photo-sensing thin film transistor can be adversely influenced.

In some embodiments of the present disclosure, a display device is provided which includes the above touch substrate. The display device can be any product or component capable of displaying, such as a liquid crystal panel, an electronic paper, an organic electroluminescent diode display panel, a liquid crystal television, a liquid crystal display, a digital photo frame, a mobile phone, a tablet and the like.

In some embodiments of the present disclosure, because the piezoelectric sensing structures are arranged on the touch substrate provided with the photo-sensing thin film transistors, press sensing can be achieved by means of the piezoelectric sensing structures without any touch sensing thin film transistor. The piezoelectric sensing structures have a simple structure, so the aperture ratio and the power consumption of the display panel may not be increased, and the liquid crystal display may not be influenced adversely, and thus are applicable to various display modes. By combining the photo-sensing thin film transistor with the piezoelectric sensing structures, the display panel can sense both the light effects and/or the piezoelectric effects when touching the display panel with fingers, and thus the accuracy and the applicable range of the display panel with photo-sensing embedded can be increased. Compared with individual photo-sensing touch, the piezoelectric sensing can cause the display panel to be usable under more intense environmental lumination; and compared with individual piezoelectric sensing, the photo-sensing can decrease the strength of the press sensing and thus extend the lifetime of the display panel.

Figure 5:
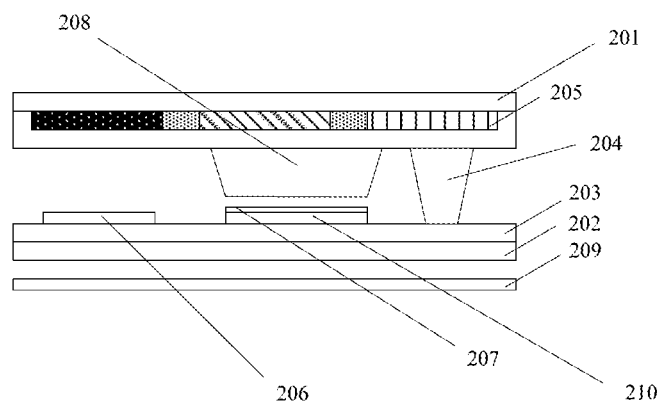
FIG. 5 is a schematic diagram of a touch substrate in some embodiments of the present disclosure.

FIG. 5 is a structural schematic diagram of a display device in some embodiments of the present disclosure. As shown in FIG. 5, the display device includes a backlight source 209, a color filter substrate, and an array substrate. The color filter substrate includes a base substrate 201 and a color filter 205 arranged on the base substrate 201. A spacer 204 is further arranged on the color filter substrate. The array substrate includes a base substrate 202, and a film layer 203 and a switch thin film transistor 206 arranged on the base substrates 202. Specifically, a photo-sensing thin film transistor 210 can be arranged in a partial region of each sub-pixel, or can be arranged every few sub-pixels. The photo-sensing thin film transistors 210 are uniformly arranged on the array substrate. At the time of operating with a finger or a stylus, the photo-sensing thin film transistor can sense infrared rays reflected back from a touch point, convert the infrared rays into electrical signals, and feed the electrical signals back to an integrated circuit which calculates the electrical signals and determines the coordinates and the shape of the touch point. The photo-sensing thin film transistor 210 can be arranged in the same layer as the switch thin film transistor 206.

Figure 6:
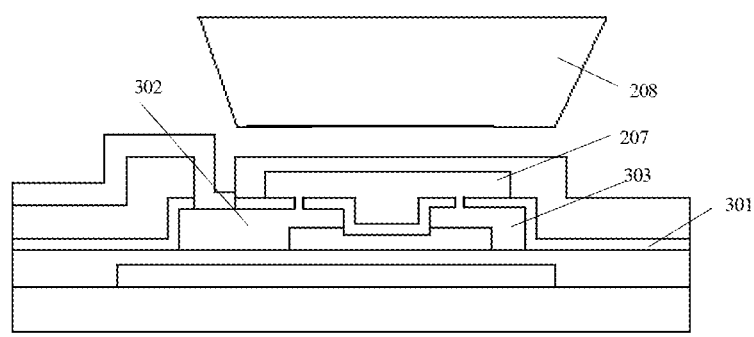
FIG. 6 is an enlarged schematic diagram of a portion of the touch substrate in some embodiments of the present disclosure.

Additionally, as shown in FIG. 6, the display device in some embodiments of the present disclosure further includes an insulation layer 301 arranged on the photo-sensing thin film transistor 210 and a piezoelectric sensing structure 207 arranged on the insulation layer 301. A size of the piezoelectric sensing structure 207 is not larger than that of the photo-sensing thin film transistor 210. The piezoelectric sensing structure 207 can deform when being pressed, and a polarization phenomenon can arise in its inside. Meanwhile, positive and negative electrical signals can be present on its two opposite surfaces respectively. When the piezoelectric sensing structure is not pressed, it returns to an uncharged state.

In some embodiments of the present disclosure, as shown in FIG. 6, a first end of the piezoelectric sensing structure 207 is connected to a source 302 of the photo-sensing thin film transistor 210, and a second end opposite to the first end of the piezoelectric sensing structure 207 is connected to a drain 303 of the photo-sensing thin film transistor 210. When the piezoelectric sensing structure 207 is pressed, charges are generated by the piezoelectric sensing structure 207. Because the insulation layer is arranged between the piezoelectric sensing structure 207 and the thin film transistor 210, the charges generated by the piezoelectric sensing structure 207 are led from the first end to the source 302 of the photo-sensing thin film transistor 210, and led from the second end to the drain 303 of the photo-sensing thin film transistor 210, such that the breakover current between the source 302 and the drain 303 of the corresponding photo-sensing thin film transistor 210 is changed, thereby obtaining the touch point by processing the electrical signals.

Further, the insulation layer may not be arranged between the piezoelectric sensing structure 207 and the photo-sensing thin film transistor 210. The first end of the piezoelectric sensing structure 207 is connected to the source of the photo-sensing thin film transistor 210, the second end opposite to the first end of the piezoelectric sensing structure 207 is connected to the drain of the photo-sensing thin film 210. When the piezoelectric sensing structure 207 is pressed, charges are generated, and the source and the drain of the corresponding photo-sensing thin film transistor 210 are turned on through the piezoelectric sensing structure 207, thereby obtaining the touch point by processing the electrical signals.

Because the piezoelectric sensing structure 207 is arranged above the photo-sensing thin film transistor 210, the piezoelectric sensing structure 207 is made of a transparent piezoelectric material having a light transmissivity larger than the first predetermined value, so as not to adversely influence the light sensing of the photo-sensing thin film transistor 210. To be specific, the transparent piezoelectric material is the polyvinylidene difluoride or the polylactide.

Because the light signals and/or the piezoelectric signals are converted into electrical signals in the same thin film transistor in some embodiments of the present disclosure, the aperture ratio and the power consumption of the display device would not be increased, which may be not adversely influence the liquid crystal display and may be applicable to various display modes. By combining the photo-sensing thin film transistor with the piezoelectric sensing structures, the display device can sense both the light effects and/or the piezoelectric effects when touching the display panel with fingers, and thus the accuracy and the applicable range of the display device with photo-sensing embedded can be increased. Compared with individual photo-sensing touch, the piezoelectric sensing can cause the display device to be usable under more intense environmental lumination; compared with individual piezoelectric sensing, the photo-sensing can decrease the strength of the press sensing and thus extend the lifetime of the display device.

Still further, as shown in FIG. 5 and FIG. 6, for the purpose of reducing the interval between the cell alignment substrate and the piezoelectric sensing structure so as to generate the piezoelectric effect c by smaller deformation to implement the touch sensing, protuberances 208, which are in one-to-one correspondence to the piezoelectric sensing structures 207, are further arranged on the color filter substrate. Optionally, the interval between the protuberance 208 and the piezoelectric sensing structure 207 is 10-100 nm. In order not to adversely influence a transmissivity of the display device or sensing of photo-sensing thin film transistor 210 to light, the protuberance 208 is made of transparent material having a light transmissivity larger than the second predetermined value.

The above are only alternative embodiments of the present disclosure. It should be pointed out that numerous modifications and embellishments can be done by one skilled in the art without departing the spirit of the present disclosure. Such modifications and embellishments should also be considered to be within the protection scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A touch substrate, comprising an array substrate and a plurality of photo-sensing thin film transistors arranged on the array substrate, wherein the touch substrate further comprises:
   a piezoelectric sensing structure arranged above at least one of the photo-sensing thin film transistors, a breakover current between a source and a drain of the photo-sensing thin film transistor corresponding to the piezoelectric sensing structure is changed when the piezoelectric sensing structure is pressed;
   a first end of the piezoelectric sensing structure is connected to the source of the photo-sensing thin film transistor, and a second end of the piezoelectric sensing structure opposite to the first end of the piezoelectric sensing structure is connected to the drain of the photo-sensing thin film transistor.

2. The touch substrate according to claim 1, wherein each of the plurality of photo-sensing thin film transistors is arranged in a partial region of a sub-pixel.

3. The touch substrate according to claim 1, wherein the plurality of photo-sensing thin film transistors is arranged uniformly on the array substrate.

4. The touch substrate according to claim 1, wherein an insulation layer is arranged between each of the at least one of the photo-sensing thin film transistors and the corresponding piezoelectric sensing structure.

5. The touch substrate according to claim 1, wherein the piezoelectric sensing structure is made of a transparent piezoelectric material having a light transmissivity larger than a first predetermined value.

6. The touch substrate according to claim 5, wherein the transparent piezoelectric material is polyvinylidene difluoride or polylactide.

7. The touch substrate according to claim 1, wherein the array substrate comprises a base substrate, and a film layer and a switch thin film transistor arranged on the base substrate;
wherein a projection of the piezoelectric sensing structure onto the base substrate coincides with a projection of the corresponding photo-sensing thin film transistor onto the base substrate, or is located within a region of the projection of the corresponding photo-sensing thin film transistor onto the base substrate.

8. The touch substrate according to claim 7, wherein the switch thin film transistor is arranged at a layer identical to the photo-sensing thin film transistor.

9. A touch display panel, comprising the touch substrate according to claim 1 and a substrate arranged oppositely to the touch substrate to form a cell with the touch substrate.

10. The touch display panel according to claim 9, wherein a protuberance is arranged at a position of the substrate corresponding to the piezoelectric sensing structure, and there exists a gap between the protuberance and the piezoelectric sensing structure.

11. The touch display panel according to claim 10, where an interval between a surface of the protuberance facing the piezoelectric sensing structure and a surface of the piezoelectric sensing structure facing the protuberance is 10-100 nm.

12. The touch substrate according to claim 10, wherein the protuberance is made of a transparent material having a light transmissivity larger than a second predetermined value.

13. The touch display panel according to claim 10, wherein the protuberance is arranged on a surface of the substrate facing the touch substrate.

14. The touch display panel according to claim 13, wherein the piezoelectric sensing structure is arranged between the corresponding photo-sensing thin film transistor and the protuberance.

15. The touch display panel according to claim 9, wherein each of the plurality of photo-sensing thin film transistors is arranged in a partial region of a sub-pixel.

16. The touch display panel according to claim 9, wherein the plurality of photo-sensing thin film transistors is arranged uniformly on the array substrate.

17. The touch display panel according to claim 9, wherein an insulation layer is arranged between the photo-sensing thin film transistor and the piezoelectric sensing structure.

18. A display device comprising the touch display panel according to claim 9.

* * * * *